Sept. 7, 1943.  L. H. DONNELL ET AL  2,328,967
STRESS-CHANGE MEASURING INSTRUMENT
Filed Jan. 17, 1940   3 Sheets-Sheet 3

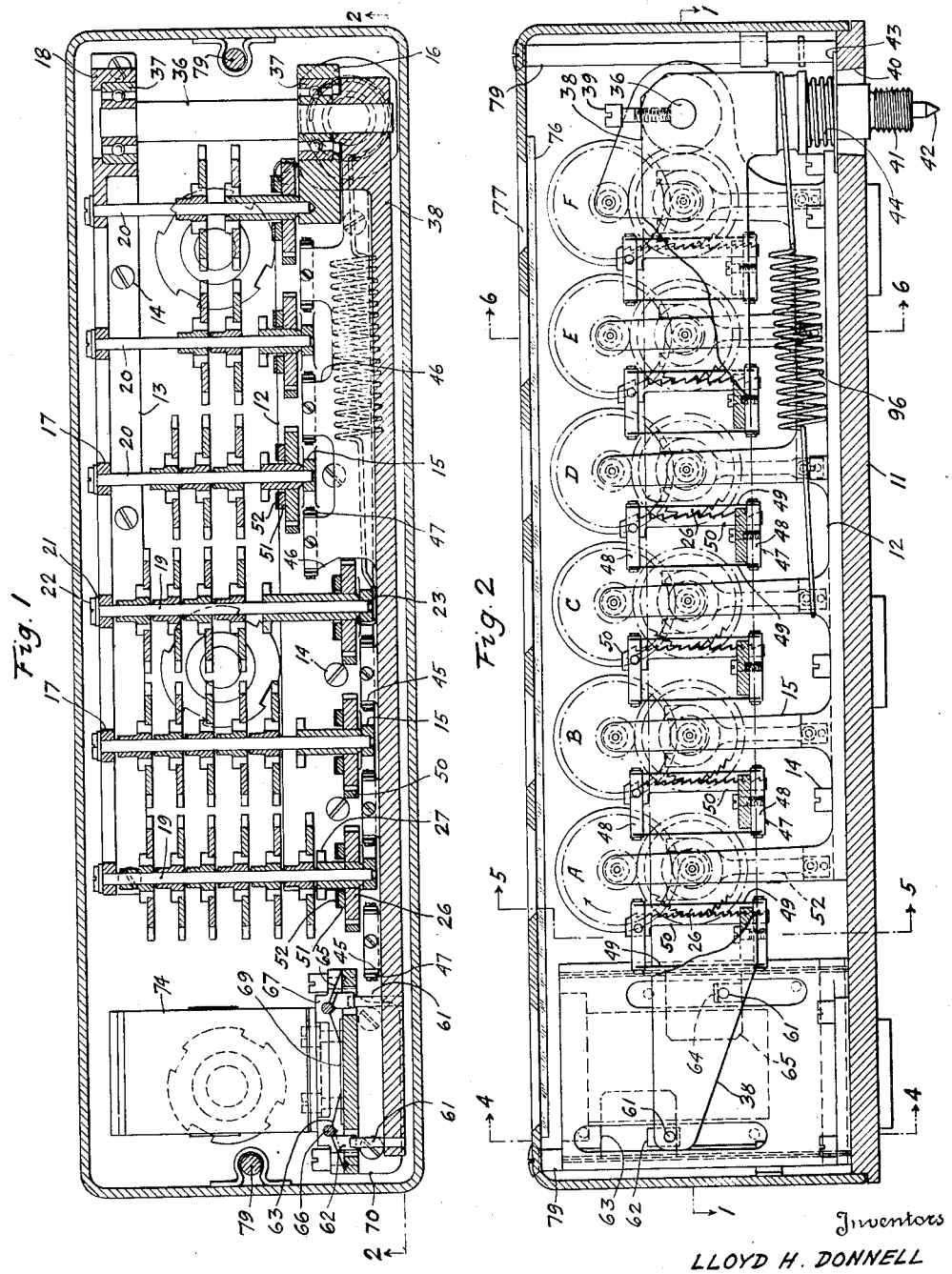
Sept. 7, 1943.  L. H. DONNELL ET AL  2,328,967
STRESS-CHANGE MEASURING INSTRUMENT
Filed Jan. 17, 1940  3 Sheets-Sheet 1
Inventors
LLOYD H. DONNELL
BENJAMIN J. SCHNITZER
By [signature]
Attorney

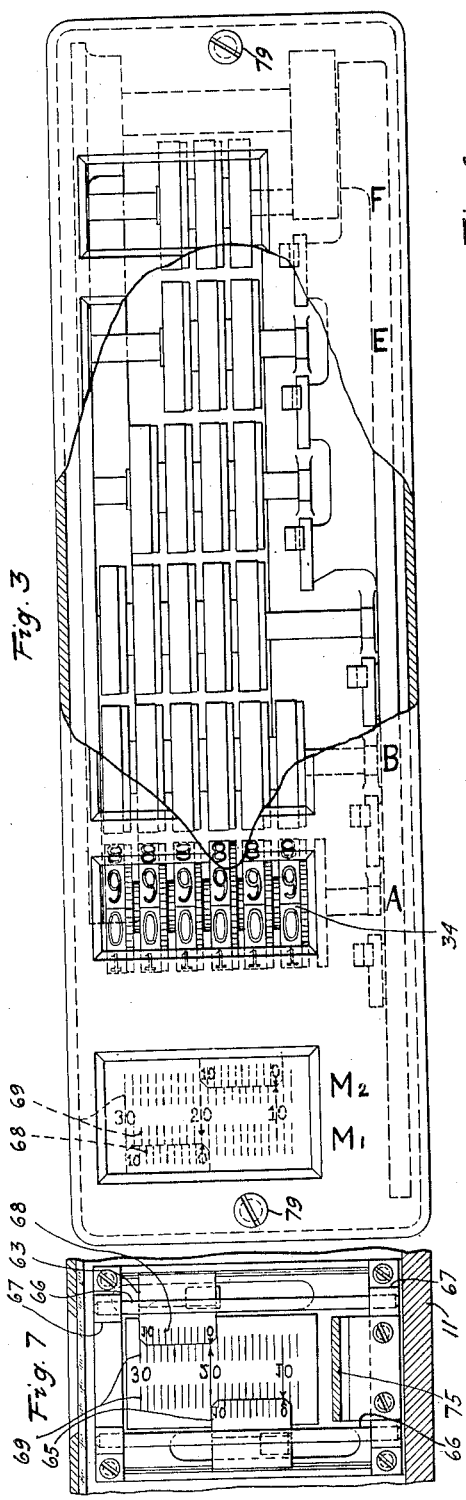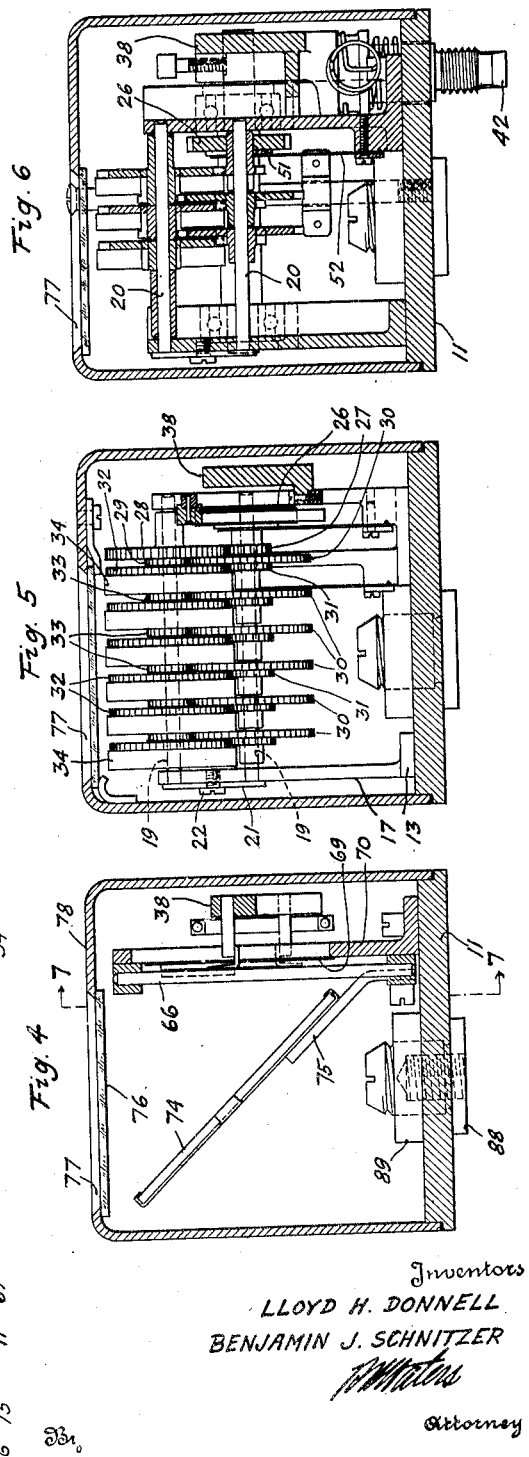

Inventors
LLOYD H. DONNELL
BENJAMIN J. SCHNITZER
Attorney

Patented Sept. 7, 1943

2,328,967

UNITED STATES PATENT OFFICE 2,328,967

STRESS-CHANGE MEASURING INSTRUMENT

Lloyd H. Donnell, Chicago, Ill., and Benjamin J. Schnitzer, Stow, Ohio, assignors by mesne assignments, to Wingfoot Corporation, Akron, Ohio, a corporation of Delaware Application January 17, 1940, Serial No. 314,238

9 Claims. (Cl. 73—51)

This invention relates to a stress-change measuring instrument and has particular reference to an instrument which registers the number of stress changes of different magnitudes to which a member for machine or structure may be subjected during a given period of time.

Aircraft, as well as many other types of machines and structures are subjected to such widely varying conditions that maximum stress and fatigue data, to be very complete, should be taken over long periods of operation. Conventional stress-recording instruments, which record stress changes on paper, or glass or metal targets, would require frequent attention in such use; moreover the evaluation of such lengthy records for fatigue purposes would be very laborious.

The instrument according to this invention has been developed to overcome these disadvantages. In its construction, use is made of ratchet wheels which require a definite amount of motion (that is, stress change) to be operated. The ratchet wheels are prevented from moving backward by friction brakes, so that they are normally operated by a constant change of movement or stress, independent of the average stress. By connecting the ratchet wheels with counting devices, a constant register is kept of the total number of such stress changes, and, by providing a number of ratchet wheels with different size teeth or operated at different mechanical advantages, a complete picture of the size and number of stress changes which have occurred during a certain time is presented. The range of the counting devices is designed to be large enough to count without repetition the significant stress changes occurring during the life of most machines.

A maximum stress register is incorporated in the instrument which involves light sliders or pointers which are pushed in one direction only by strain movements, being held by friction in their extreme positions.

The object of this invention is to count separately the number of stress changes of different magnitudes occurring in a member during a certain period of time.

Another object of this invention is to provide means by which the increased fatigue effect of a stress change, when the average stress is high, or the different fatigue effects of tensile as compared to compressive stress changes when the member contains rivets or bolts, can be compensated for.

A further object of this invention is the provision of means for indicating the greatest tensile and compressive stress occurring during a test period.

Other objects and advantages of this invention shall be described in this specification by reference to the accompanying drawings of which:

Fig. 1 is a longitudinal cross-sectional plan view of the stress-change measuring instrument along the line 1—1 of Fig. 2.

Fig. 2 is a longitudinal cross-sectional side view along the line 2—2 of Fig. 1, with the operating lever partially broken away.

Fig. 3 is a plan view of Fig. 2 with the cover partially broken away.

Fig. 4 is a cross-sectional view along the line 4—4 of Fig. 2.

Fig. 5 is a cross-sectional view along the line 5—5 of Fig. 2.

Fig. 6 is a cross-sectional view along the line 6—6 of Fig. 2.

Fig. 7 is a fractional longitudinal section along the line 7—7 of Fig. 4.

Figure 8:
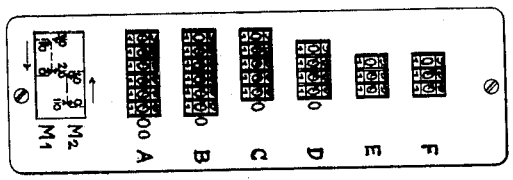
Fig. 8 is a top view of the stress-change measuring instrument, showing the registering drums.

Referring to the Figures 1 to 7, the mechanism of the stress-change measuring instrument comprises a base plate 11, on which, opposite each other, are mounted support brackets 12 and 13 by screws 14. From these brackets extend vertical supports 15, 16, 17 and 18, in each of which are carried above one another shafts 19 and 20, respectively. These shafts, on which the transmission gear trains of the stress change counters A, B, C, D, E and F are rotatably mounted, are held in position at one end by plates 21 and screws 22, and by shoulders 23 at the other end.

Only the transmission gear set A will be described here because the other sets are of similar construction. This consists on the lower shaft 19 of a ratchet wheel 26 to which is connected a pinion 27 meshing a spur gear 28 which revolves about an upper shaft 19. A pinion 29, fixed to the gear 28, is in mesh with the spur gear 30 revolving about the lower shaft, to which again a pinion 31, in mesh with the spur gear 32, carrying a pinion 33, is connected. The spur gear 32 carries a counting drum 34, provided with the digits 0 to 9 on its circumference. By additional sets of gears 30, 31 and 32, 33 on the lower and upper shafts, respectively, the number of counting drums 34 can be accordingly increased. Conveniently, the reduction in speed is made ten times slower for each succeeding drum. The largest number of counting drums assembled in one set is provided for stress changes of low magnitude and considerable frequency, and an accordingly smaller set for stress changes of greater magnitude, but of lesser frequency.

A fulcrum shaft 36, centered by ball bearings 37 in the supports 16 and 18, carries a bell-crank operating lever 38 and is secured to it by a screw 39. The operating lever passes with its short arm, substantially in vertical position, through an oblong opening 40 in the base plate 11 and is provided at its end with a threaded portion 41 and a hardened knife edge 42 which contacts with the test specimen. The opening is closed against penetration of dust and dirt by a cover 43 which is pressed against the base plate by a spring 44. The horizontal arm of the operating lever is provided with side extensions 45 and 46 to which are screwed framelike rack holders 47 of rectangular shape, consisting of two cross bars 48 which are spaced by flat springs 49 screwed to their ends. To the inside of the top cross bar is fitted and fastened a rack 50 which engages the ratchet wheel 26.

In order to permit the ratchet wheel to rotate in one direction only, that is, when the operating lever 38 pushes the rack 50 downwardly, a friction brake 51 pressed by a spring 52 against the ratchet wheel holds the latter fixed when the rack moves in opposite direction and whereby the flexible springs 49 allow the rack to be pushed out of engagement with the ratchet wheel.

The operating lever is provided at the outer end of its long arm with two stud pins 61, one of which engages in one direction the lug 62 fastened to the slide 63 and the other one engages, when moving in the opposite direction, the lug 64 fastened to the slide 65. The slides 63 and 65, guided by rods 66 which are held by supports 67, are each provided with a vernier 68 and slide along the scales 69 on the bracket 70 to indicate the largest stress in tension and in compression which occurred in the test member during the duration of a test. The slides are made preferably of resilient material and hold their positions, to which they are pushed occasionally by friction. A mirror 74 supported by a bracket 75 fastened to the base plate is held at an angle of 45° to the indicator scale and reflects the indication in vertical direction through a window 76 covering openings 77 in the instrument casing 78 which is fastened by bolts 79 to the base plate 11.

To increase the gage length of the instrument an extension 85, carrying a fixed hardened knife edge 86, may be fastened by screws 87 to fittings 88, which are secured by nuts 89 to the base plate 11. The distance between the fixed knife edge 86 and the movable knife edge 42 on the vertical arm of the operating lever 38 represents the gauge length "$l$" of the instrument, which is clamped by a flexible clamp 90 to the test specimen 91 (Fig. 3).

The illustrated construction of the stress-change measuring instrument, for example, provides six different registers, marked A, B, C, D, E and F, each of which is designed, for instance, for about 1.5 times higher range of stress change than the preceding one. The minimum stress change $\Delta\sigma$ required to operate each ratchet depends on the modulus of elasticity, E, of the member to which it is attached, as well as on the gauge length $l$ and the effective length of the instrument arm $r$, and is $$\Delta\sigma = K\left(E\frac{r}{l}\right)$$

where K is a constant for the instrument. Values of K for each ratchet may be marked on the instrument.

Figures 10, 11, 12, 13:
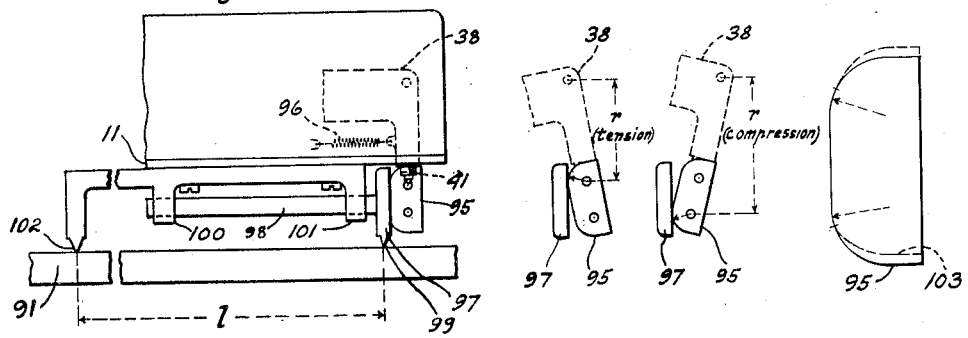
Fig. 10 is a fractional view of a modification of the construction shown in Fig. 9.
Fig. 11 is a fractional view of the operating lever in position for tension forces.
Fig. 12 is the same as Fig. 11, but in position for compression forces.
Fig. 13 is a side view of the operating cam shown in Figs. 11 and 12, with modification in dotted lines.
Figure 14:
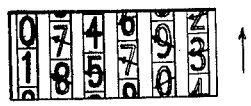
Fig. 14 is a view of an example of a counting drum reading.

In Fig. 10 is shown diagrammatically a modification of the instrument in which the short leg of the operating arm 38 has attached to its screw thread 41 an adapter or cam 95, which is pressed by a spring 96 against a plate 97 provided with a hardened knife edge 99 in contact with the test piece 91. The plate 97 is secured to a slide 98 which is movable in guides 100 and 101 attached to the base plate 11 of the instrument. The base plate 11 also carries an integral arm formed with a knife edge 102 engaging with the test piece 91. The distance $l$ between the knife edge 102 and the knife edge 99 is the gauge length of the instrument.

The cam or adapter for increasing the effective length of the operating lever can be attached so that the instrument can readily be mounted in a great variety of ways to suit the circumstances under which it is to be used. The shape of the cam can be adjusted to give different weights to stress changes involving different average stresses. Thus tensile stress changes probably have a greater effect than compressive stress changes on members containing rivets or bolts. Figures 11 and 12 suggest how a cam can be used with the instrument to allow for this by giving different effective lengths to the arm for the two kinds of stress. Fig. 13 suggests how the same cam 95 could be modified as shown by the dotted line 103 to also allow, by increasing the instrument movement, for the increased fatigue effect when the average (either tensile or compressive) stress is large. In the operation of the apparatus of Fig. 10 tensioning the test piece 91 will position the cam 95 as shown in Fig. 11, and compressing the test piece will position the cam 95 as shown in Fig. 12. In other words, a different, effective leverage is obtained when the test piece is subjected to tension than is obtained when the test piece is subjected to compression.

Figure 9:
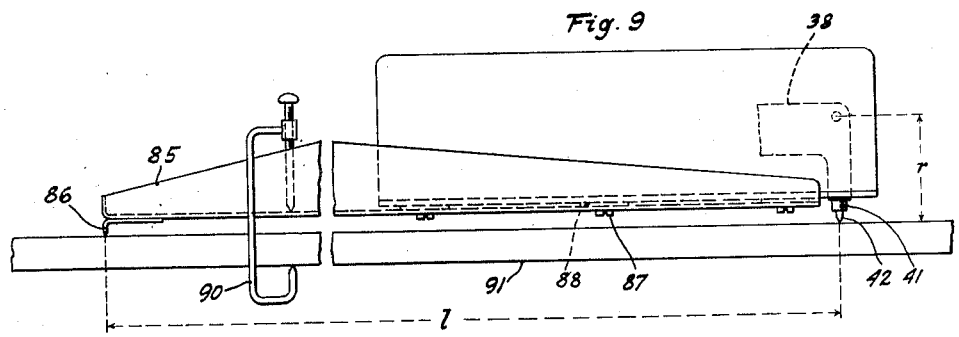
Fig. 9 is a side view of the stress-change measuring instrument assembly attached to a test sample.

To obtain the maximum readings M1 and M2 in Fig. 3, the cover 78 should be removed before taking zero readings and the sliders pushed lightly apart as far as they will go. The gauge length should be adjusted so that when this is done the sliders are in approximately the position shown. When the instrument is installed, as shown in Figs. 8 and 9, the stress indicated by M1 will be positive and represents the maximum tensile stress experienced by the member; similarly the stress indicated by M2 will be negative and represents the maximum compressive stress experienced by the member.

It is to be noted that the ratchets A, B etc. are operated not only by the minimum stress changes, but by all larger stress changes also. Therefore deductions from the readings of each counting device may be made accordingly.

The number of teeth of each ratchet wheel, multiplied by the transmission ratio, can be chosen so that the first figure represents an even ten or hundred and each following figure denotes a ten-times-greater value than the preceding one. Then the number of zeros marked on the right side of the instrument cover shall indicate the value of the first figure.

It should be understood that the foregoing specification does not limit this invention to the construction shown in the drawings, but shall include all other modifications coming within the scope and spirit of this invention as claimed.

Having thus fully described our invention, what we claim and desire to secure by Letters Patent of the United States is:

1. In a stress-change measuring instrument, the combination with a casing of a stationary and a movable contact thereon adapted to contact the material to be stressed, a series of registering devices, a ratchet wheel connected to each registering device for driving same, each ratchet wheel having teeth of different spacing, an operating means connected to said movable contact to be actuated thereby, and connecting means between each ratchet wheel and said operating means for actuating said ratchet wheel upon movement of said movable contact member, whereby the ratchet wheels having teeth of greater spacing are only actuated on movement of said connecting means a greater amount than required to actuate a ratchet wheel having the lesser spacing for the teeth.

2. An instrument for measuring and counting stress changes in members comprising an operating lever, a support pivotally carrying the operating lever, one end of said operating lever contacting the test member, said support engaging with the test member at a point remote from the operating lever, a plurality of spaced ratchet racks resiliently mounted on said operating lever longitudinally thereof, a measuring and counting device arranged opposite each one of said ratchet racks, and a ratchet wheel connected to each measuring and counting device and in engagement with a corresponding ratchet rack, the effective leverage on the operating lever for each ratchet rack and its pitch being made so that each measuring and counting device measures and counts minimum stress changes of a magnitude greater than the one preceding it along said lever.

3. An instrument for measuring and counting stress changes in members of various constructions comprising an operating lever, a support pivotally carrying the operating lever, one end of said operating lever contacting the test member and adapted to receive impulses therefrom, said support engaging with the test member at a point remote from the operating lever, a plurality of spaced ratchet racks each having a plurality of teeth, said ratchet racks being resiliently mounted on said operating lever longitudinally thereof, a measuring and counting device arranged opposite each one of said ratchet racks and a ratchet wheel connected to each measuring and counting device and in engagement with a corresponding ratchet rack, each of said measuring and counting devices comprising a train of gears, revolvably supported by two parallel shafts, one above the other, some of the gears on the upper shaft being provided with counting drums, all of which revolve in the same direction, a friction brake on each ratchet wheel to prevent its rotation in opposite direction, the effective leverage on the operating lever for each ratchet rack and its pitch being made so that each measuring and counting device measures and counts minimum stress changes of a magnitude greater than the one preceding it along said lever.

4. An instrument for indicating stress changes of different magnitudes in a structural member, comprising at least two spaced relatively movable contact members for contacting the structural member at spaced points, actuating means connected to at least one of said contact members and movable in response to relative movement between said contact members during stressing of the structural member, indicating devices for indicating each stress change of at least a certain predetermined minimum magnitude, each such indicating device indicating all stresses of different minimum amounts as well as those of greater amounts, and each being set to indicate different minimum stress changes, and means connecting said actuating means to each of said indicating devices in such a manner as to actuate each of said indicating means only when the minimum stress is equal to that which is to be indicated thereby.

5. A stress change measuring instrument including in combination a casing, a pair of spaced contacts associated therewith and adapted to contact the material to be stressed, one of said contacts being fixed to said casing and the other contact being slidably mounted relative to said fixed contact, a series of registering devices, a two-armed spring-tensioned operating lever swingably mounted in said casing, a series of racks resiliently attached to and in spaced relation along one of the arms of said lever, each rack being in operative engagement with one of said registering devices, and a cam attached to the end of the other arm of said lever and pressing against said slidable contact, said cam operating to change the effective length of the arm of the lever supporting it and adapted to operate at a shorter effective length for tension stress changes than for compression stress changes.

6. In a stress-change measuring instrument, the combination of a pair of spaced, relatively-movable contacts adapted to contact the material to be stressed, a series of registering devices, means including an arcuately swinging lever for actuating the registering devices, connecting means between the actuating means and at least one of said contacts for moving said swinging lever of the actuating means upon relative movement of said contacts, said registering devices being positioned longitudinally along the swinging lever so that the swinging of the lever actuates each registering device to a different degree.

7. A stress change measuring instrument including in combination a casing, a pair of spaced contacts associated therewith and adapted to contact the material to be stressed, one of said contacts being fixed to said casing and the other contact being slidably mounted relative to said fixed contact, a series of registering devices, a two-armed spring-tensioned operating lever swingably mounted in said casing, a series of racks resiliently attached to and in spaced relation along one of the arms of said lever, each rack being in operative engagement with one of said registering devices, and a cam attached to the end of the other arm of said lever and pressing against said slidable contact, said cam operating to change the effective length of the arm of the lever supporting it.

8. A stress change measuring instrument including in combination a casing, a pair of spaced contacts associated therewith and adapted to contact the material to be stressed, one of said contacts being fixed to said casing and the other contact being slidably mounted relative to said fixed contact, a series of registering devices, a two-armed spring-tensioned operating lever swingably mounted in said casing, and a series of racks resiliently attached to and in spaced relation along one of the arms of said lever, each rack being in operative engagement with one of said registering devices.

9. A stress-change measuring instrument comprising a pair of relatively movable contacts adapted to engage with the member tested, a stress indicating means, and means connecting the contacts with the stress indicating means so that a certain effective operating leverage is achieved and so that relative movement of the contacts causes an indication of stress on the indicating means, and cam and follower means interposed in the connecting means and acting to change the effective operating leverage of the connecting means under material variations in stress.

LLOYD H. DONNELL.
BENJAMIN J. SCHNITZER.